July 21, 1970 J. L. AKER 3,521,175

IDENTITY CIRCUIT FOR DME

Original Filed Aug. 24, 1966

INVENTOR

John L. Aker

BY Scofield, Kokjer, Scofield & Lowe
ATTORNEYS

United States Patent Office 3,521,175
Patented July 21, 1970

3,521,175

IDENTITY CIRCUIT FOR DME

John L. Aker, Olathe, Kans., assignor to King Radio Corporation, Olathe, Kans., a corporation of Kansas Original application Aug. 24, 1966, Ser. No. 574,701, now Patent No. 3,412,400, dated Nov. 19, 1968. Divided and this application Aug. 26, 1968, Ser. No. 755,117
Int. Cl. H03k 5/20
U.S. Cl. 328—138 5 Claims

ABSTRACT OF THE DISCLOSURE

An identity circuit for use with distance measuring equipment has a one-shot monostable Pulse Stretcher which is triggered on for a preselected time each time a video pulse is produced by the IF section of an associated DME. The output of this monostable is applied to a Darlington circuit having a negative feedback network including a "Twin T" filter with a notch in its transfer characteristics at the identity signal frequency. The active pass band characteristics of the combination Darlington circuit and "Twin T" filter network are enhanced by using the average DC component of the voltage block out of the one-shot monostable to control bias the Darlington. The selected identity signal is passed on to a suitable audio amplifier circuit.

BACKGROUND AND BRIEF DESCRIPTION OF THE INVENTION

Figure 1:
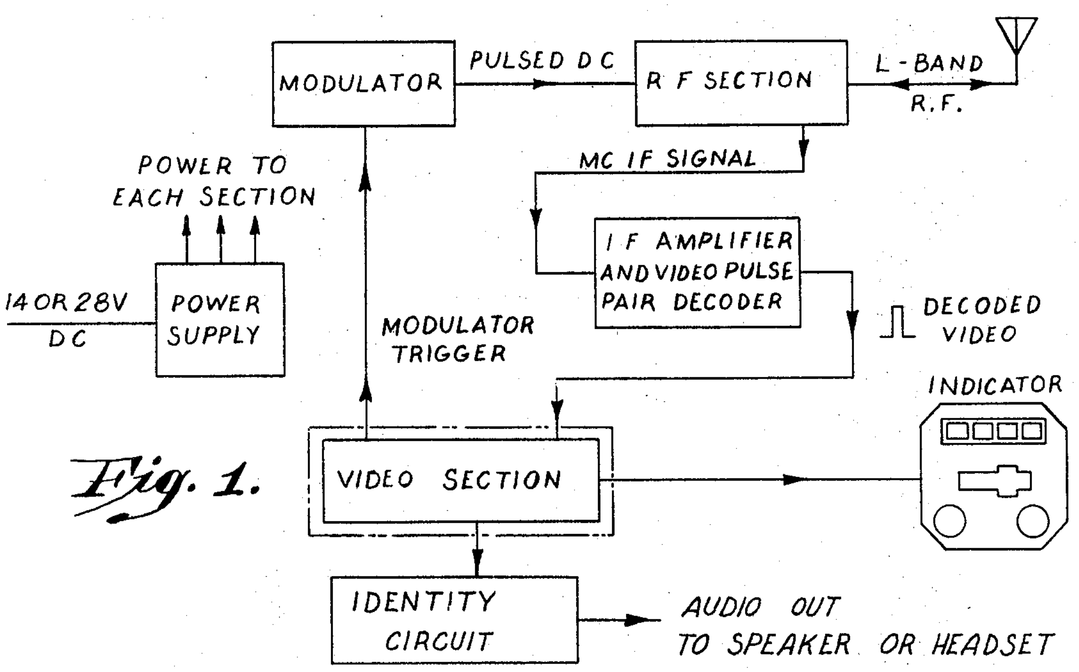

This is a division of my application Ser. No. 574,701, entitled "Method and Apparatus for Digitally Measuring Distance," filed Aug. 24, 1966, now Pat. No. 3,412,400, Nov. 19, 1968.

The identity circuit significantly aids in optimalizing the usability of the DME described in my patent application mentioned above. Pulse signals are transmitted at an audio rate by each DME ground station on all VOR/DME channels to help the pilot verify what he is receiving. For example, Mid-Continent International Airport, serving the greater Kansas City, Mo. area, may transmit in International Morse Code, the letters M-C-I every forty-five (45) seconds. Between these periods of identity, the ground station transmits semi-randomly spaced pulse pairs at approximately 2700 PRF. This signal, when processed by conventional filtering techniques, often produces an annoying background noise in the pilot's headset. By utilizing my identity circuit, only a pleasant audio tone will be received by the pilot during DME operation.

The identity signal takes the form of pulses transmitted at a 1350 Hz. repetition rate and generally requires a filtering network to aid in the reception of same. During the normal operation of the DME, a received pulse on a VOR/DME channel will be processed in a conventional IF section thereby forming a video pulse. My identity circuit utilizes this video pulse to trigger a monostable for a preselected period of time. The monostable produces a voltage block which is filtered, thereby changing the ratio of the DC component to the AC component of this voltage block.

A Darlington circuit is then used to amplify the filtered signal and to reverse the phase of same with respect to the input thereto. This circuit includes a negative feedback loop having a "Twin T" network therein with a notch in its transfer characteristics at the specified 1350 Hz. Accordingly, the amplifier has its full gain at 1350 Hz., while at other frequencies, the output is fed back through the "Twin T" network to cancel the input voltage and to reduce the net again of the amplifier to nearly unity.

The net or average DC component out of the monostable likewise has a pass band effect on the identity circuitry as the DC component at 1350 PRF will bias the Darlington circuit to its optimal operating point. At either a higher or lower PRF, the transistors in the Darlington circuit will be biased toward saturation or cut-off, respectively, thereby holding the gain down.

An object of my invention is to provide a new and improved identity circuit for receiving audio signals.

Another object of my invention is to provide a circuit which utilizes the average DC component of a monostable output in conjunction with a notch filter-negative feedback circuit to eliminate unwanted noise from an audio output.

A further object of my invention is to provide an idenity circuit of the character described which optimalizes the functioning of Distance Measuring Equipment. It is an important feature of my invention that the verification or identity signal emanating from DME ground station VOR/DME channels may be received as pleasant audio tones by the pilot during DME operation and my identity circuit insures this operation. As a result, unwanted frequencies are eliminated from possible audio reception and the over-all use of the DME circuit is enhanced.

DETAILED DESCRIPTION OF THE DRAWINGS

Figure 2:
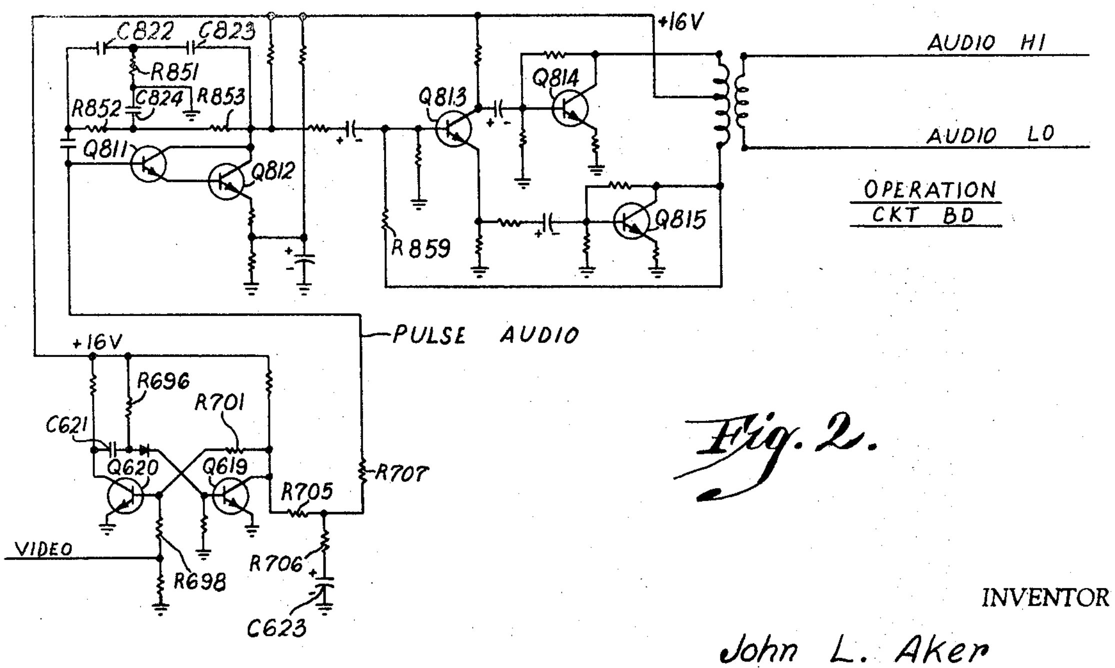

In the accompanying drawings which form a part of the specification and are to be read in conjunction therewith, and in which like numerals represent like parts in the various views;

FIG. 1 is a block diagram showing the principal sections of a DME and the relationship of my identity circuit thereto; and FIG. 2 is a circuit diagram of the identity circuitry.

Referring initially to FIG. 1, it will be noted therein that signals or pulses from the ground station are received by the antenna, passed through the RF section to the IF section where they become decoded video pulses and are then presented to the video section for either a search or track decision and/or operation, and finally to the indicator for the informational displays. As suggested above, DME ground station VOR/DME channels transmit an identity signal every 45 seconds. This signal identifies the particular transmitting ground station and results in the temporary disabling of the DME as far as distance information goes. Accordingly, when the ground station transmits its identity signal, the only decoded pulse out of the IF amplifier is the pulse representative of the ground station identity which has been transmitted at 1350 PRF. It is, however, necessary that a suitable filtering means be provided to clearly identify and select this pulse and to eliminate unwanted noise and normal DME operational noise from the audio signal.

The identity circuit is placed in operation by the triggering of the Video Pulse Stretcher (Q619, Q620) shown in FIG. 2. (Note that the received signal is applied to the base of Q620 via the video line and that the monostable operates in a conventional manner.) This one-shot monostable is triggered on for about 150 microseconds by each video pulse from the IF section. The collector of Q619 goes positive during this length of time and applies a voltage block to the filter network comprised of R705, R706, R707 and capacitor C623. This network changes the ratio of the DC component to the AC component of the voltage block. The output of this network is applied directly to the base of Q811 (which along with Q812 forms a Darlington circuit having a gain of about 40 with the output reversed in phase with respect to the input). It should be noted that the output from the video Pulse Stretcher is the only source of DC bias to this stage (the Darlington circuit).

The Darlington circuit has a negative feed back network connected from collector to base of transistor Q811 and includes resistors R851, R852, R853; capacitors C822, C823 and C824. This resistive capacitive network forms a "Twin T" which has a notch in its transfer characteristics at 1350 Hz. Accordingly, the amplifier (Darlington circuit) has its full gain of 40 at 1350 Hz. At other frequencies, a large part of the output is fed back to the amplifier input through the "Twin T" network in such a fashion as to cancel the input voltage, thus reducing the net gain of the amplifier to near unity.

A further pass-band effect (in addition to that of the "Twin T") is obtained by use of the net DC component out of the Pulse Stretcher (Q619, Q620). If the Pulse Stretcher is being triggered at a low rate, its output voltage will *average* only slightly above ground potential. At a high trigger rate, such as 2700 PRF, the output voltage may be designed to average around 10 volts. The DC component at 1350 PRF will, however, bias Q811 and Q812 (the Darlington circuit) to their optimum operating points. At lower or higher PRF's, these transistors will be biased toward cut off or saturation, respectively. In this manner, the average DC output of the Pulse Stretcher cooperates with the "Twin T" notch to eliminate noise and spurious signals from the audio output and, if all audio signals are tied together, the VOR audio is not obscured by same.

The output from the Darlington circuit is essentially a sine wave at 1350 Hz. which is then applied to the base of transistor Q813. Q813 is an audio Phase Inverter which supplies two signals 180° apart to the bases of the push-pull output transistors Q814 and Q815. Q814 and Q815 operate in class B to provide 50 to 100 milliwatts of sine-wave identity tone. Resistor R859 acts as a DC bias for transistor Q813 and supplies negative feed back for the audio circuit.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An identity circuit for the reception of audio signals from a ground station, said signals being transmitted at a preselected PRF, said identity circuit comprising a monostable circuit, said monostable circuit operable to be triggered by said ground stations signals thereby producing a voltage block, an amplifier circuit, a circuit means for coupling said voltage block to said amplifier circuit; and means associated with said amplifier circuit for causing said amplifier circuit to have full gain at a preselected frequency and to operate near unity gain at frequencies other than said preselected frequency thereby effectively rejecting all frequencies except said preselected frequency, said preselected frequency corresponding to said audio signals from said ground station.

2. The invention as in claim 1 wherein said amplifier circuit has a negative feedback network, said network including a "Twin T" notch filter therein.

3. The invention as in claim 1 wherein said amplifier circuit has a negative feedback network, a "Twin T" notch filter network, said "Twin T" notch filter network, being operatively located in said feedback network, said "Twin T" notch filter network having its transfer characteristics at said preselected frequency thereby effectively canceling said input voltage to said amplifier circuit at frequencies other than said preselected frequency.

4. The invention as in claim 1 wherein the average DC voltage of said voltage block is used to bias said amplifier circuit to preclude amplification thereof at other than the preselected frequency.

5. In a DME which measures the time duration between the transmission of an interrogation pulse and the reception of a return by said DME, said DME including an identity circuit for identifying the ground station which transmits audio signals at a preselected PRF, the improvement in said circuit comprising, a monostable circuit, said monostable circuit operable to be triggered by said ground stations signals thereby producing a voltage block, an amplifier circuit, a circuit means for coupling said voltage block to said amplifier circuit; and means associated with said amplifier circuit for causing said amplifier circuit to have full gain at a preselected frequency and to operate near unity gain at frequencies other than said preselected frequency thereby effectively rejecting all frequencies except said preselected frequency, said preselected frequency corresponding to said audio signals from said ground station.

References Cited

UNITED STATES PATENTS

| | | | |
|---|---|---|---|
| 2,584,386 | 2/1952 | Hare | 330—109 XR |
| 3,193,774 | 7/1965 | Clapper | 307—233 XR |
| 3,440,442 | 4/1969 | Ehni | 307—233 |

DONALD D. FORRER, Primary Examiner

J. ZAZWORSKY, Assistant Examiner

U.S. Cl. X.R.

307—233; 328—140